US012625414B2

(12) United States Patent
Chao et al.

(10) Patent No.: US 12,625,414 B2
(45) Date of Patent: May 12, 2026

(54) OPTICAL ELEMENT DRIVING MECHANISM

(71) Applicant: TDK TAIWAN CORP., Taoyuan City (TW)

(72) Inventors: Chen-Hung Chao, Taoyuan City (TW); Po-Xiang Zhuang, Taoyuan City (TW); Chao-Chang Hu, Taoyuan City (TW); Yi-Ho Chen, Taoyuan City (TW)

(73) Assignee: TDK TAIWAN CORP., Taoyuan City (TW)

( * ) Notice: Subject to any disclaimer, the term of this patent is extended or adjusted under 35 U.S.C. 154(b) by 313 days.

(21) Appl. No.: 18/501,754

(22) Filed: Nov. 3, 2023

(65) Prior Publication Data

US 2024/0152034 A1 May 9, 2024

Related U.S. Application Data

(60) Provisional application No. 63/422,734, filed on Nov. 4, 2022.

(51) Int. Cl.
*G03B 9/22* (2021.01)
*G03B 17/12* (2021.01)

(52) U.S. Cl.
CPC ............... *G03B 9/22* (2013.01); *G03B 17/12* (2013.01)

(58) Field of Classification Search
CPC . G03B 9/22; G03B 9/06; G03B 17/12; G03B 3/10; G03B 30/00
USPC .......................... 359/896, 425, 811, 819, 823
See application file for complete search history.

(56) References Cited

U.S. PATENT DOCUMENTS

| | | | | |
|---|---|---|---|---|
| 2019/0227253 | A1* | 7/2019 | Fan | G03B 17/17 |
| 2019/0227255 | A1* | 7/2019 | Hu | G03B 3/10 |
| 2019/0227259 | A1* | 7/2019 | Hsu | G02B 7/09 |
| 2019/0227337 | A1* | 7/2019 | Kuo | G03B 5/00 |
| 2019/0230262 | A1* | 7/2019 | Wang | G09G 5/003 |
| 2021/0132328 | A1* | 5/2021 | Hu | G02B 27/646 |
| 2024/0077697 | A1* | 3/2024 | Zhuang | G02B 13/001 |
| 2024/0077745 | A1* | 3/2024 | Zhuang | G02B 5/005 |
| 2024/0085718 | A1* | 3/2024 | Zhuang | G02B 27/646 |
| 2024/0151932 | A1* | 5/2024 | Hu | H02K 41/0354 |
| 2024/0151936 | A1* | 5/2024 | Hu | G02B 7/08 |
| 2024/0152029 | A1* | 5/2024 | Hu | G03B 3/10 |
| 2024/0176158 | A1* | 5/2024 | Zhuang | G02B 7/08 |
| 2024/0337909 | A1* | 10/2024 | Peng | G03B 7/26 |
| 2025/0138275 | A1* | 5/2025 | Zhuang | G03B 5/00 |

* cited by examiner

*Primary Examiner* — William R Alexander
(74) *Attorney, Agent, or Firm* — MUNCY, GEISSLER, OLDS & LOWE, P.C.

(57) ABSTRACT

An optical element driving mechanism is provided, which includes a movable portion, a fixed portion and a driving assembly. The movable portion is connected with an optical element. The movable portion is movable relative to the fixed portion. The driving assembly is configured to drive the movable portion to move relative to the fixed portion.

19 Claims, 10 Drawing Sheets

OPTICAL ELEMENT DRIVING MECHANISM

CROSS REFERENCE TO RELATED APPLICATIONS

This application claims the benefit of U.S. Provisional Application No. 63/422,734, filed Nov. 4, 2022, the entirety of which is incorporated by reference herein.

BACKGROUND OF THE INVENTION

Field of the Invention

The present invention relates to an optical element driving mechanism, and in particular to an optical element driving mechanism that includes a structural strengthening element.

Description of the Related Art

Many electronic devices (such as smartphones and digital cameras) now have the function of taking pictures and recording videos thanks to the ongoing development of the related technology. The use of these electronic devices is becoming increasingly widespread, and they are evolving towards more convenient and lightweight designs to offer users a wider range of choices.

The aforementioned electrical devices (those that have photography and video-recording functionality) are usually equipped with an optical element driving mechanism to drive the optical element (for example, aperture blades) to move, thereby achieving the effect of controlling the amount of light input. However, the current trend of mobile devices is to be smaller and more durable. Therefore, how to effectively reduce the size of the optical element driving mechanism and improve its durability has become an important issue.

BRIEF SUMMARY OF THE INVENTION

The present invention provides an optical element driving mechanism, which includes a movable portion, a fixed portion and a driving assembly. The movable portion is connected to an optical element. The movable portion is movable relative to the fixed portion. The driving assembly is configured to drive the movable portion to move relative to the fixed portion.

According to some embodiments of the present disclosure, the optical element driving mechanism further includes a structural strengthening element. Materials for the structural strengthening elements include magnetic impermeable metals or metals with low magnetic permeability.

According to some embodiments of the present disclosure, the structural strengthening element includes: a body with a plate-like structure, wherein the thickness of the body is less than 0.2 mm and greater than 0.05 mm; a receiving space with a recessed structure and located on the body, and the depth of the receiving space is less than 0.2 mm and greater than 0.05 mm; and an opening located in the receiving space.

According to some embodiments of the present disclosure, the fixed portion includes a fixing element. The opening corresponds to the fixing element. The fixing element passes through the opening to affix the structural strengthening element to the fixed portion.

According to some embodiments of the present disclosure, the optical element driving mechanism further includes a circuit member and an electrical element. The driving assembly includes a first driving portion and a second driving portion. The circuit member is electrically connected to an external module. The circuit member includes a first circuit element, a second circuit element, a connecting element, a first external element and a second external element. The first circuit element is electrically connected to the first driving portion. The second circuit element is electrically connected to the electrical element and the second driving portion. The connecting element electrically connects the first circuit element to the second circuit element. The first external element is electrically connected to the external module. The second external element is electrically connected to the external module.

According to some embodiments of the present disclosure, the electrical element is electrically connected to the external module via the second circuit element and the second external element in sequence.

According to some embodiments of the present disclosure, the electrical element is electrically connected to the external module via the second circuit element, the connecting element, the first circuit element and the first external element in sequence.

According to some embodiments of the present disclosure, the first circuit element includes a metal line with a plate-like structure. The connecting element includes another metal line with a plate-like structure. The thickness of the metal line of the first circuit element is less than the thickness of the other metal line of the connecting element.

According to some embodiments of the present disclosure, the ratio of the thickness of the metal line of the first circuit element to the thickness of the other metal line of the connecting element is less than 0.5.

According to some embodiments of the present disclosure, the optical element driving mechanism further includes a magnetically permeable element disposed on the first circuit element of the circuit member. The first driving portion includes a magnetic element. The magnetic element is disposed on the movable portion. The magnetically permeable element corresponds to the magnetic element of the first driving portion.

According to some embodiments of the present disclosure, the optical element driving mechanism further includes a structural strengthening element. The connecting element of the circuit member is disposed in the fixed portion by insert molding and is connected to the first circuit element and the second circuit element.

According to some embodiments of the present disclosure, the connecting element includes a joint portion exposed from the fixed portion. The structural strengthening element is affixed to the fixed portion by soldering the joint portion.

According to some embodiments of the present disclosure, the optical element driving mechanism further includes a structural strengthening element. The structural strengthening element includes a cutting portion. The cutting portion are on opposite sides of the structural strengthening element. The cutting portion has a straight edge.

According to some embodiments of the present disclosure, the optical element driving mechanism further includes a circuit member. The structural strengthening element is affixed to the fixed portion by soldering the cutting portions and the circuit member together.

According to some embodiments of the present disclosure, the optical element driving mechanism further includes a structural strengthening element. The fixed portion includes an outer ring portion, an inner ring portion, a middle portion and a bottom. Both the outer ring portion and the inner ring portion are annular structures centered on a main axis, and the radius of the outer ring portion is larger than the radius of the inner ring portion. The outer ring portion and the inner ring portion each extend from the bottom along the main axis. The middle portion is between the outer ring portion and the inner ring portion. The movable portion is movably disposed in the middle portion. The structural strengthening element is disposed on the inner ring portion.

According to some embodiments of the present disclosure, the inner ring portion includes a first surface and a second surface perpendicular to the main axis. The first surface is covered by the structural strengthening element and the second surface is not covered by the structural strengthening element.

According to some embodiments of the present disclosure, the movable portion includes an upper surface. The bottom of the fixed portion includes a bottom surface, the upper surface is parallel to the bottom surface, and the upper surface and the bottom surface are perpendicular to a plane in the main axis.

According to some embodiments of the present disclosure, the shortest distance between the structural strengthening element provided on the inner ring portion and the bottom surface of the fixed portion is shorter than the shortest distance between the upper surface and the bottom surface.

According to some embodiments of the present disclosure, the inner ring portion further includes a step, an inner surface and a first protruding portion. The outer ring portion includes an outer surface. The movable portion includes a second protruding portion. The structural strengthening element includes a positioning hole. The step of the inner ring portion protrudes from the inner surface in a direction away from the outer surface. The step, the inner surface and the outer surface are parallel to the main axis. The first protruding portion and the second protruding portion extend along the main axis. The first protruding portion passes through the positioning hole of the structural strengthening element to position the structural strengthening element on the inner ring portion. The first protruding portion and the second protruding portion are respectively connected to the optical element.

According to some embodiments of the present disclosure, the distance between the first protruding portion and the outer surface of the outer ring portion is longer than the distance between the second protruding portion and the outer surface of the outer ring portion.

BRIEF DESCRIPTION OF THE DRAWINGS

The present invention can be clearly understood from the following detailed description together with the accompanying drawings. It is emphasized that, in accordance with standard practice in the industry, various features are not drawn to scale and are used for illustration purposes only. In fact, the dimensions of the various features may be arbitrarily exaggerated or reduced for clarity of illustration.

4

Figure 2A:
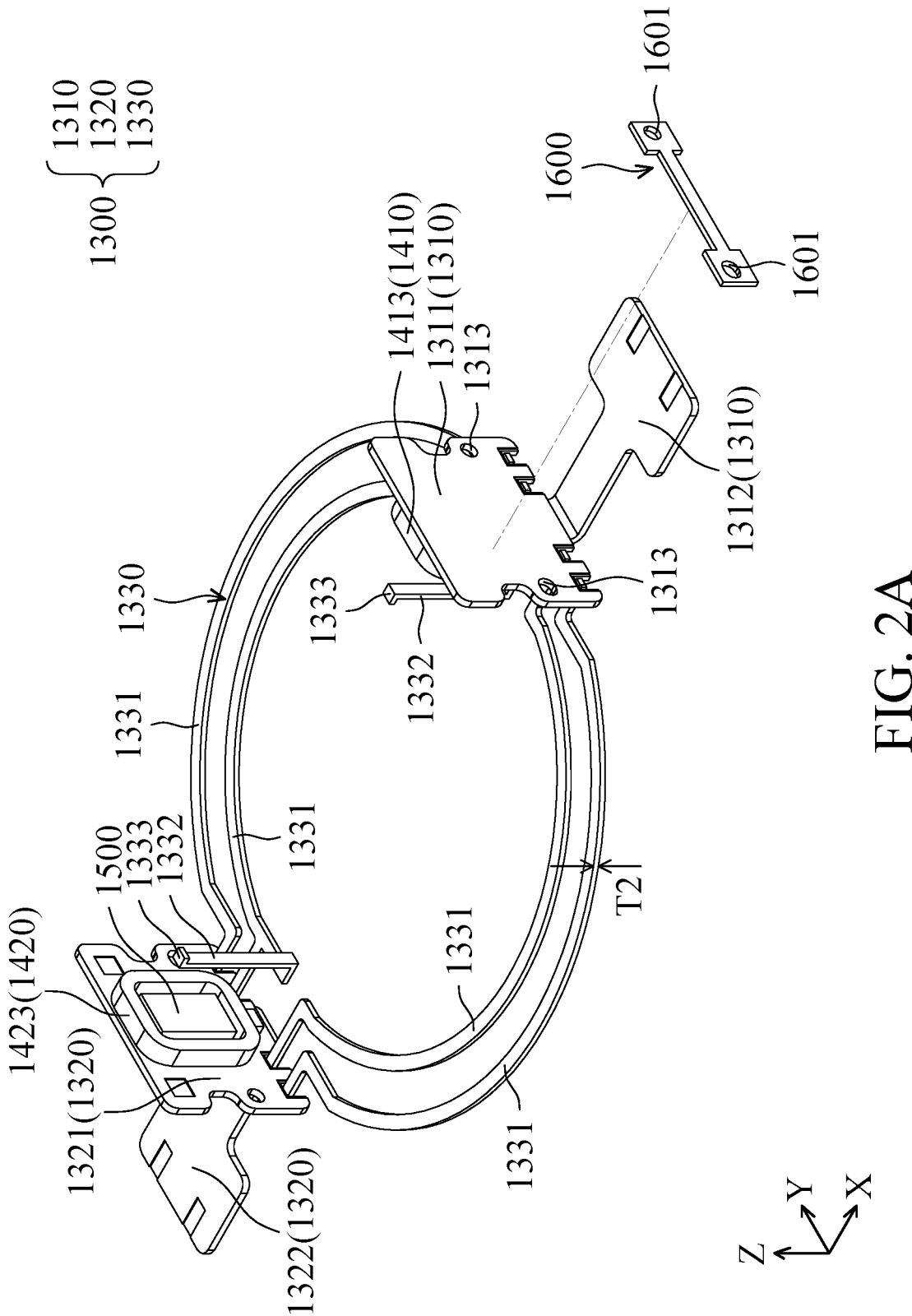

FIG. 2A shows a perspective view of a circuit member, coils, electrical elements and a magnetically permeable element according to some embodiments of the present disclosure.

Figure 2B:
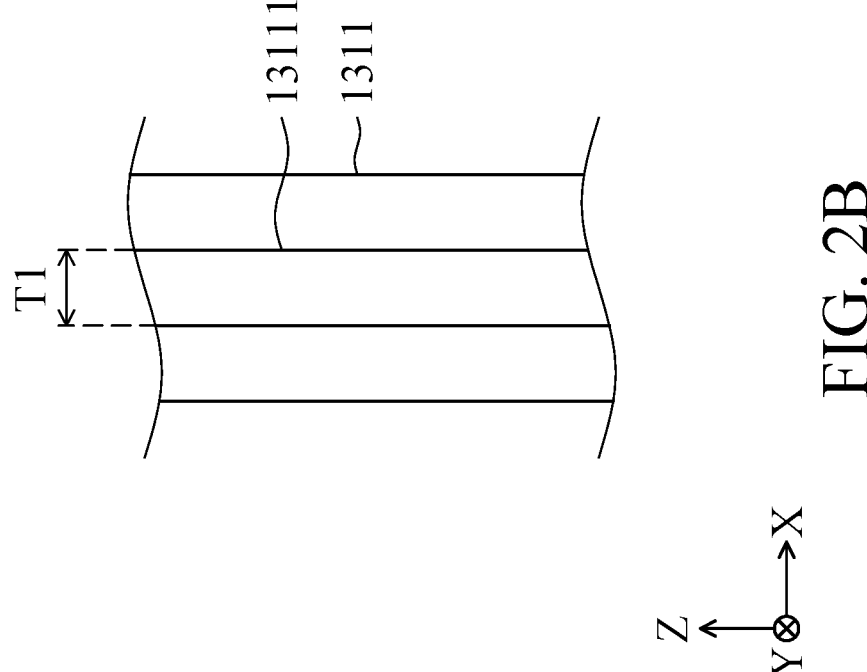

FIG. 2B shows a cross-sectional view of a first circuit element according to some embodiments of the present disclosure.

Figure 3A:
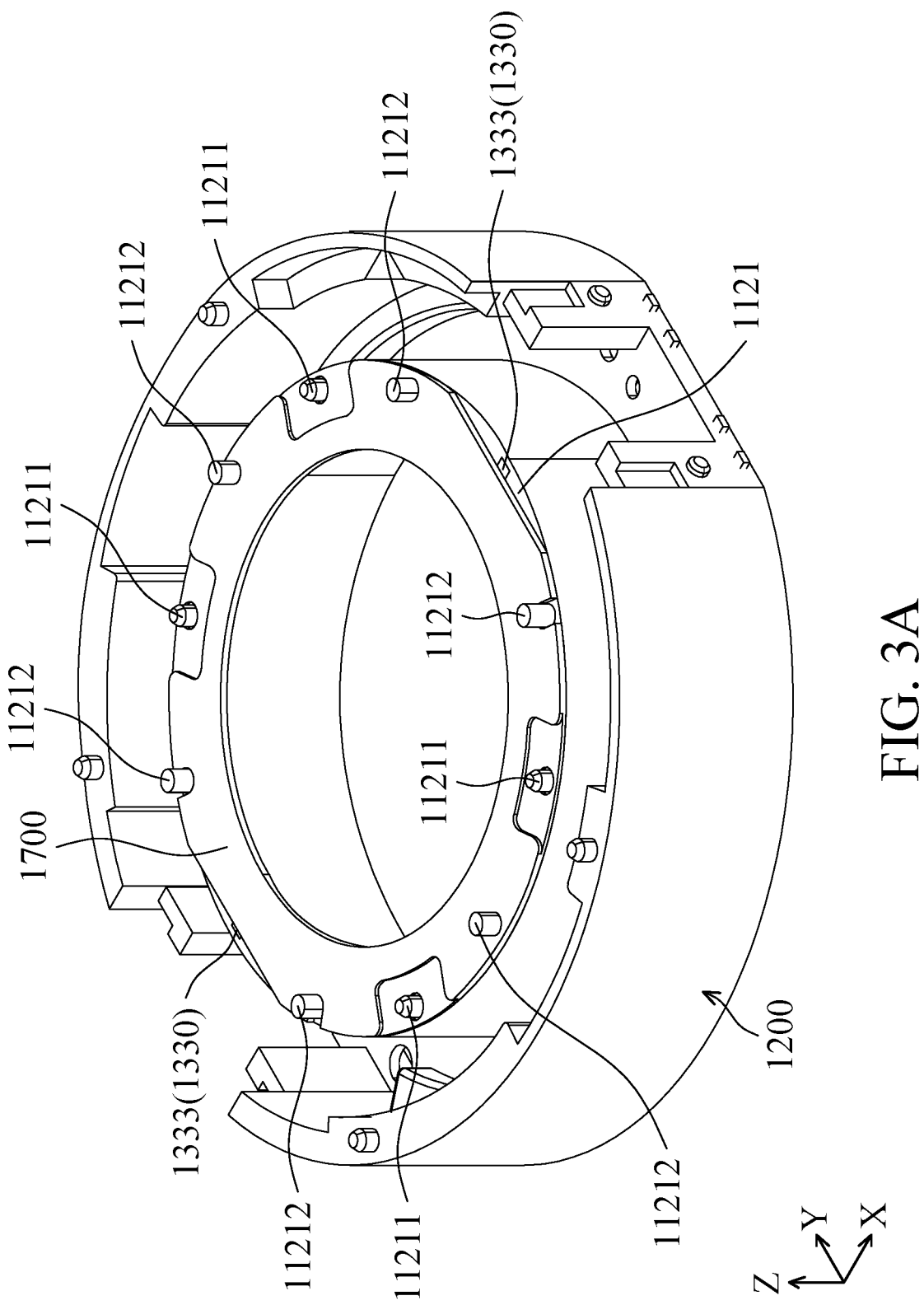

FIG. 3A shows a perspective view of a base, connecting elements embedded in the base, and a structural strengthening element according to some embodiments of the present disclosure.

Figure 3B:
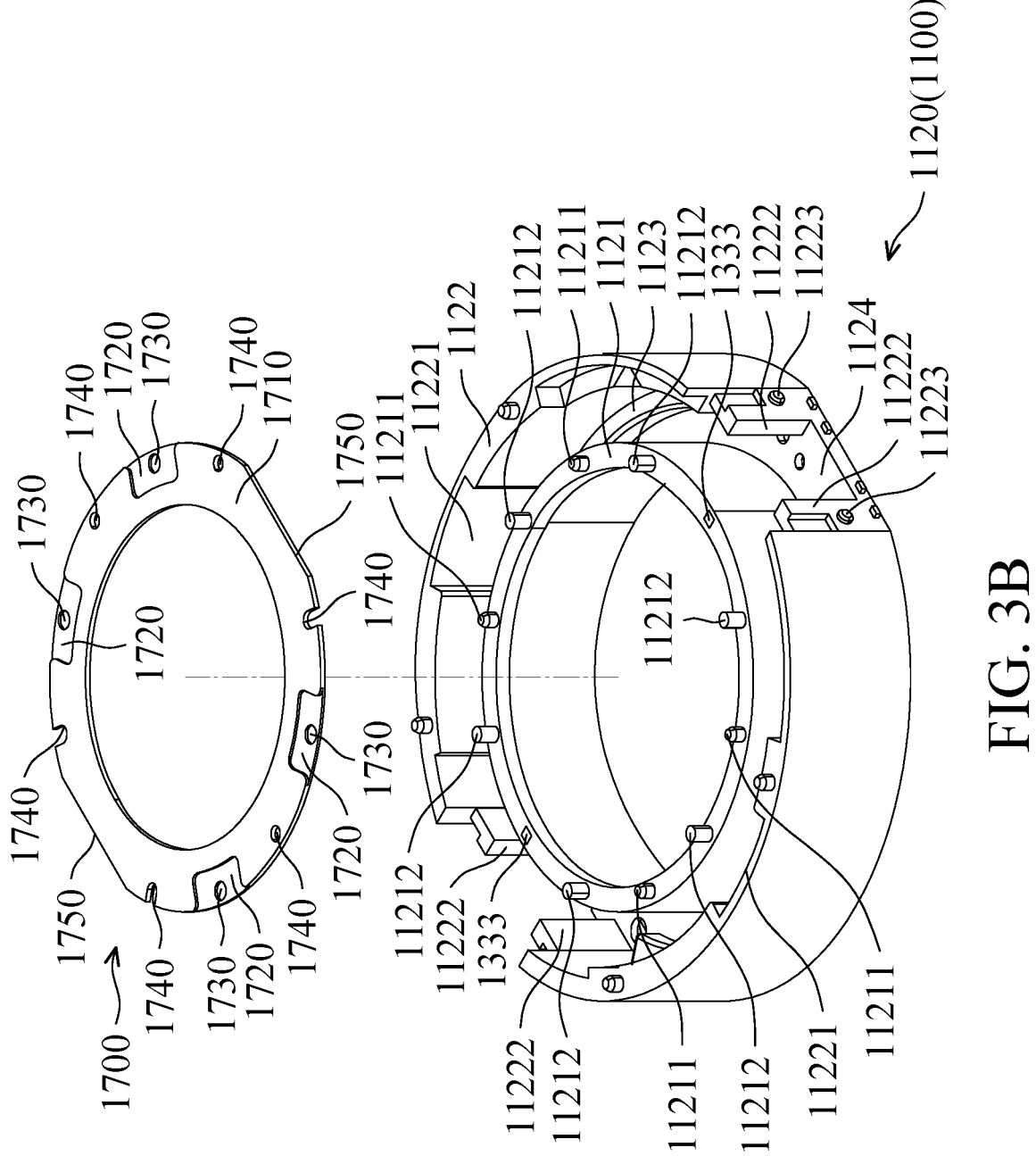

FIG. 3B shows a view of the structural strengthening element of FIG. 3A separated from the base.

Figure 4:
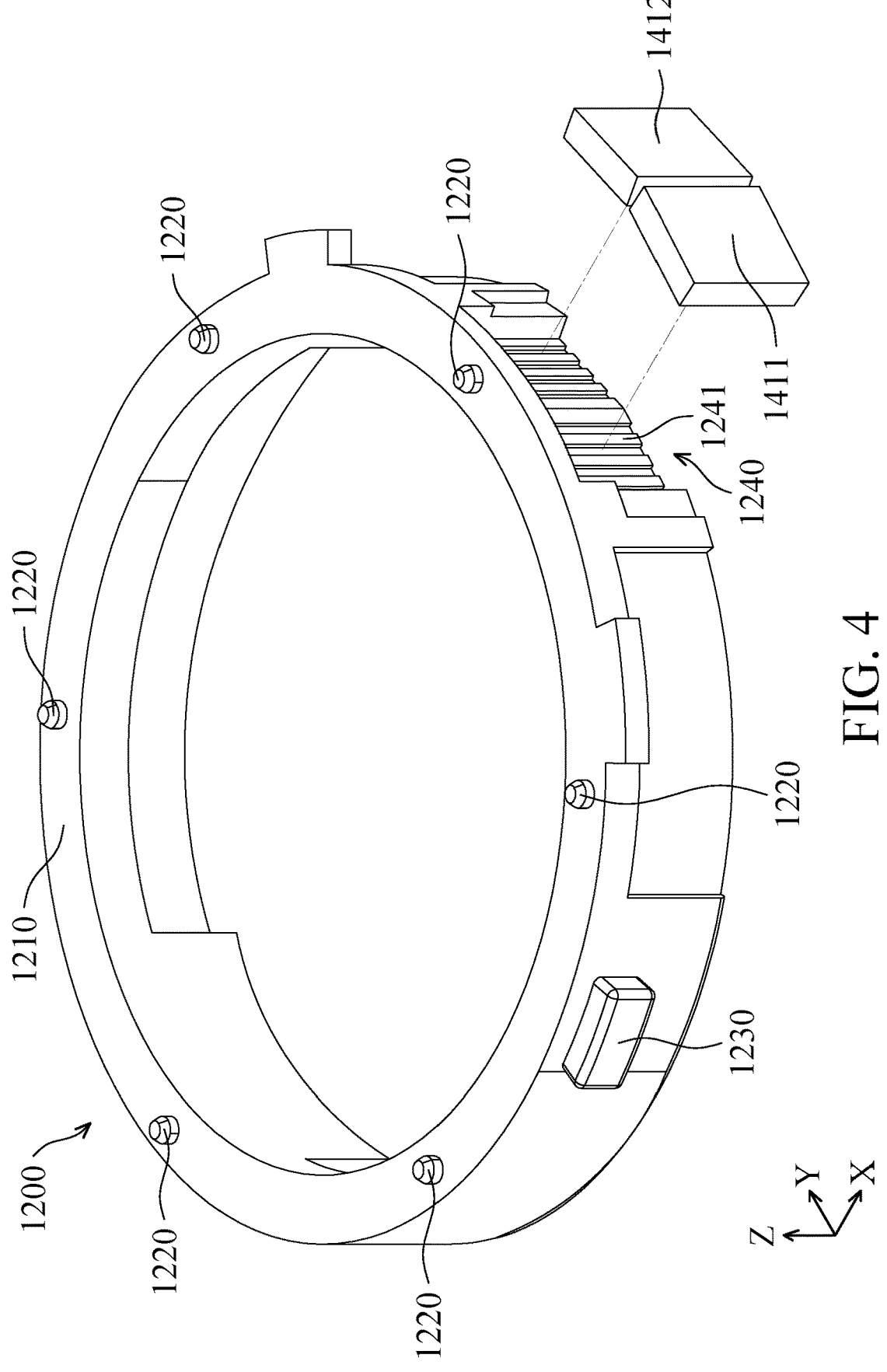

FIG. 4 shows a perspective view of a movable portion and magnetic elements according to some embodiments of the present disclosure.

Figure 5:
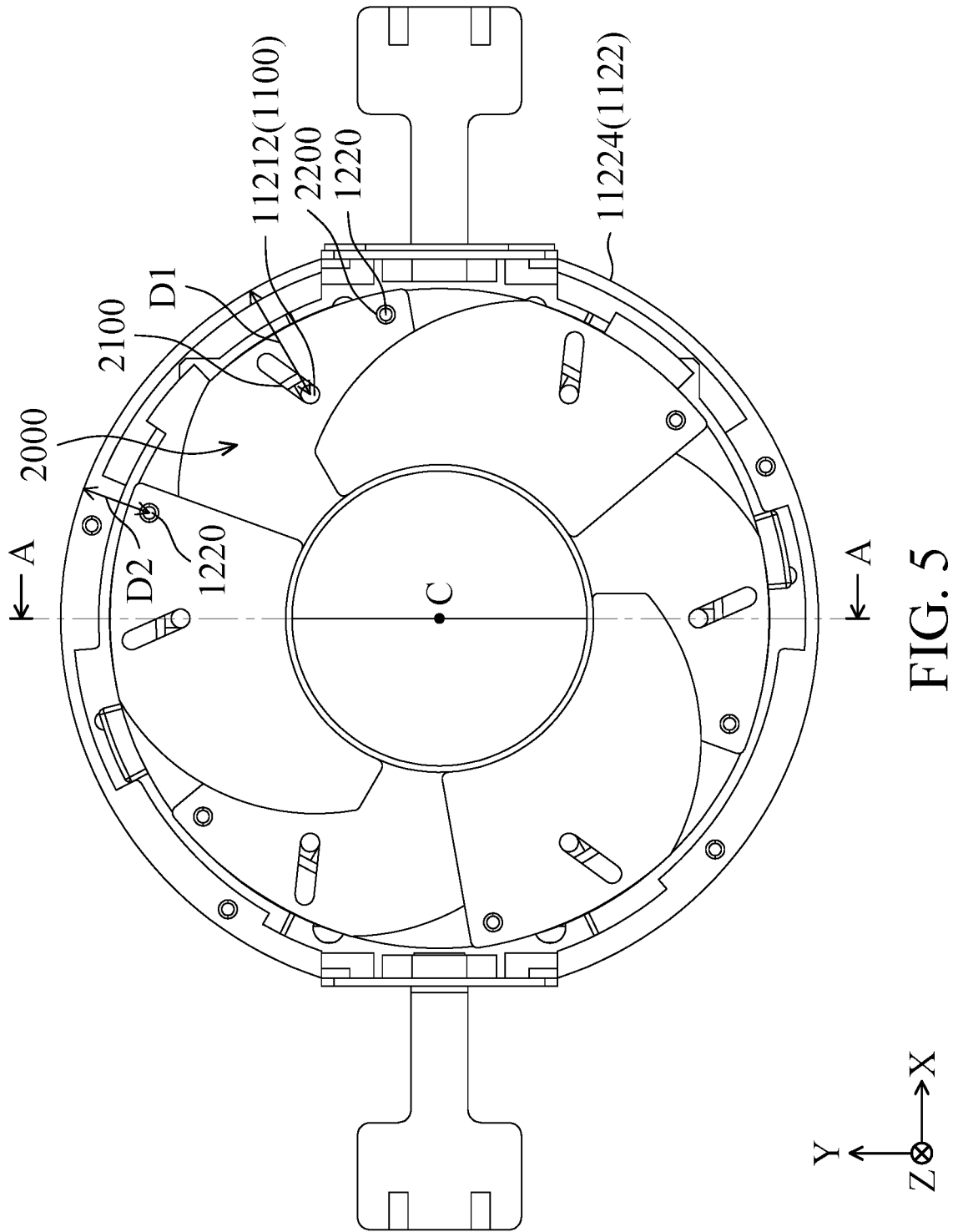

FIG. 5 shows a top view of the optical element driving mechanism according to some embodiments of the present disclosure, with the top cover not shown for illustrative purposes.

Figure 6:
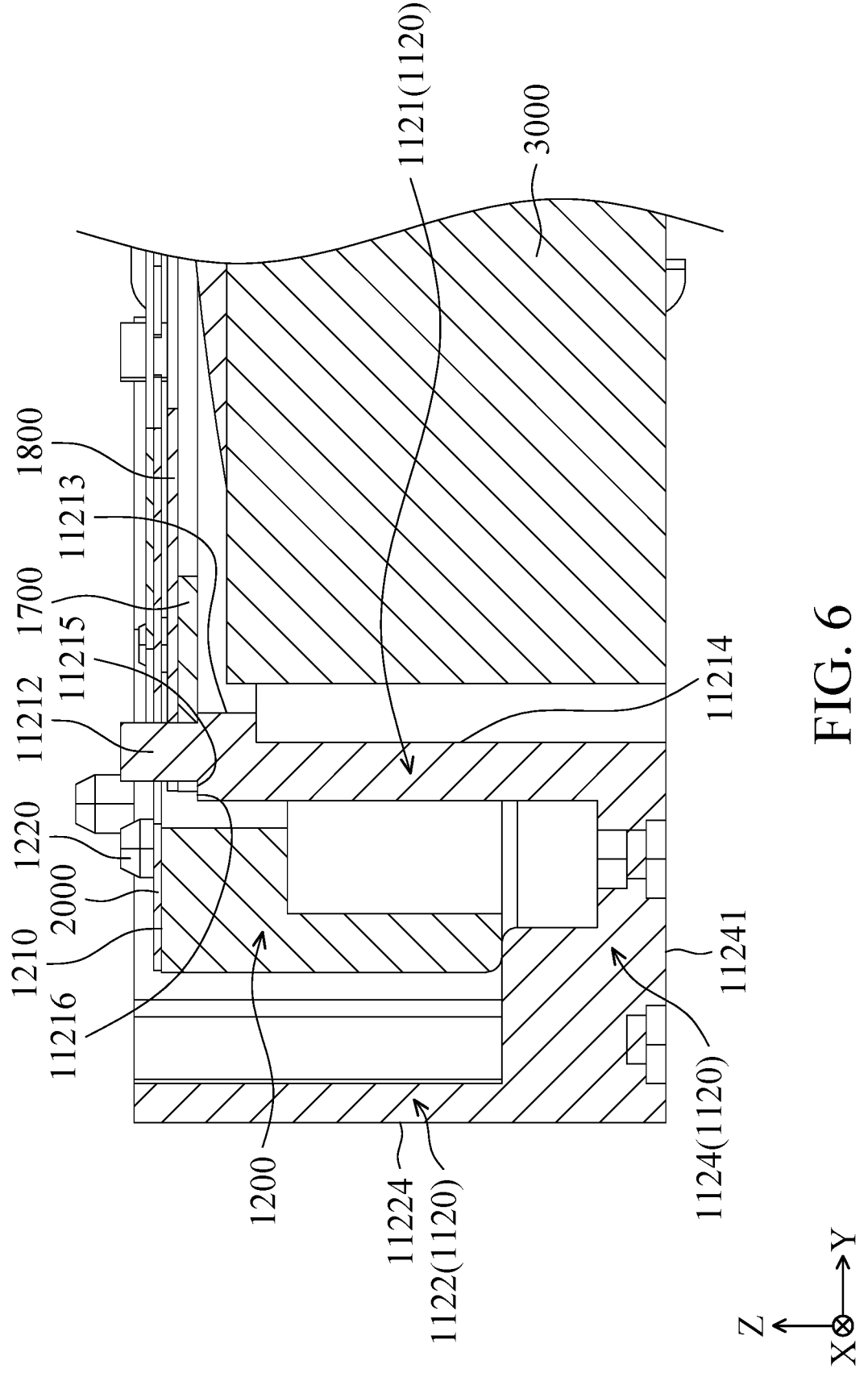

FIG. 6 shows a partial cross-sectional view of the optical element driving mechanism taken along line A-A in FIG. 5.

Figure 7:
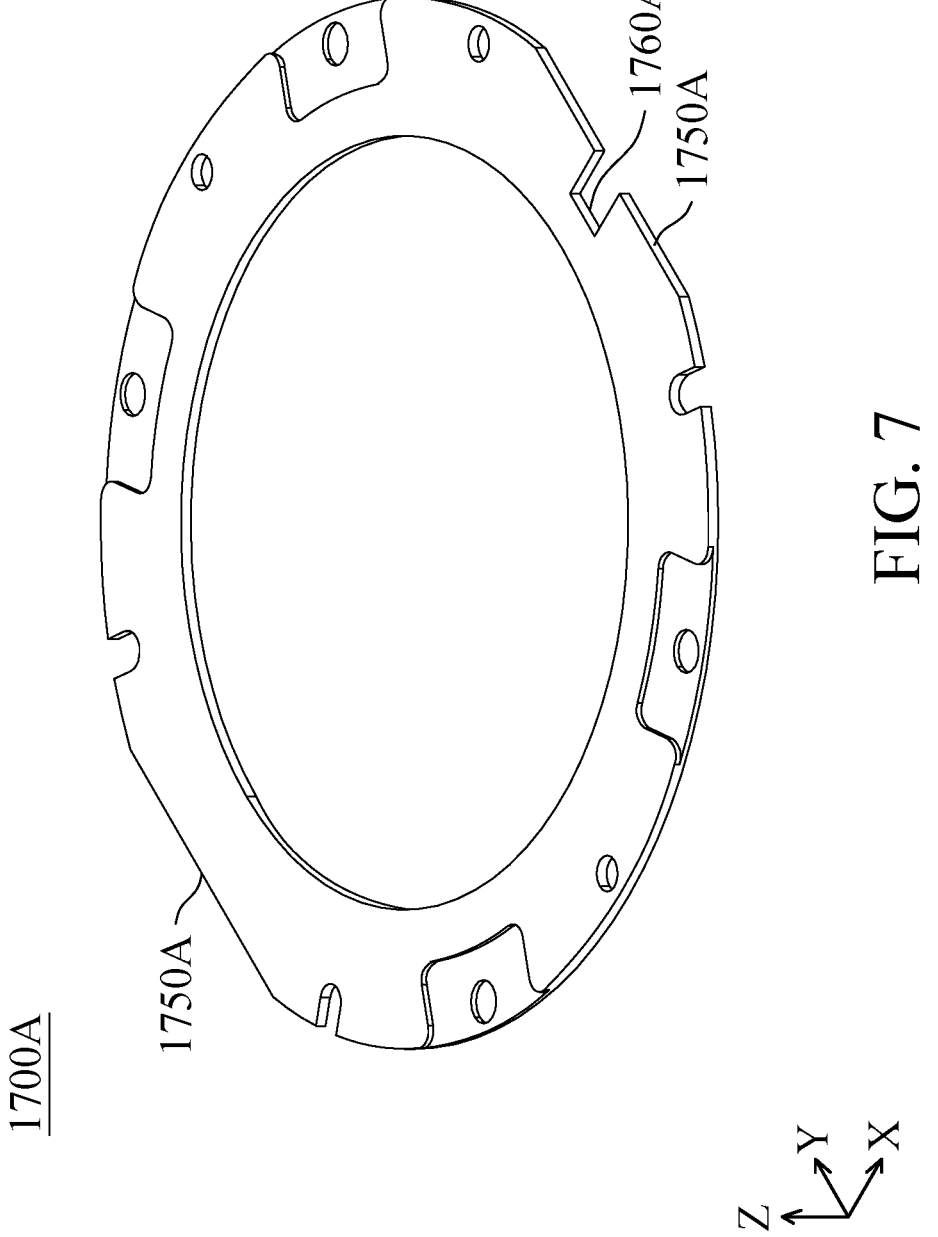

FIG. 7 shows a structural strengthening element according to another embodiment of the present disclosure.

DETAILED DESCRIPTION OF THE INVENTION

In order to make the purpose, features, and advantages of the present invention more clearly understandable, embodiments are given below and described in detail with reference to the accompanying drawings. The configuration of each element in the embodiment is for illustrative purposes only and is not intended to limit the present invention. In addition, the partial repetition of numbers in the drawing in the embodiments is for simplifying the description and does not imply the correlation between different embodiments. Directional terms mentioned in the following embodiments, such as up, down, left, right, front or back, etc., are only for reference to the directions in the attached drawings. Accordingly, the directional terms used are illustrative and not limiting of the invention.

In addition, relative terms, such as "lower" or "bottom" and "upper" or "top" may be used in the embodiments to describe the relative relationship of one element to another element in the figures. It will be understood that if the illustrated device was turned upside down, elements described as being on the "lower" side would become elements described as being on the "upper" side.

The following describes the optical element driving mechanism according to the embodiment of the present invention. However, it can be readily appreciated that the present embodiments provide many suitable inventive concepts that can be embodied in a wide variety of specific contexts. The specific embodiments disclosed are merely illustrative of specific ways to use the invention and are not intended to limit the scope of the invention. Unless otherwise defined, all terms (including technical and scientific terms) used herein have the same meaning as commonly understood by one of ordinary skill in the art to which this disclosure belongs. It is understood that these terms, such as those defined in commonly used dictionaries, should be interpreted to have a meaning consistent with the relevant art and the background or context of the invention, and should not be interpreted in an idealistic or overly formal manner unless specifically defined herein.

Figure 1A:
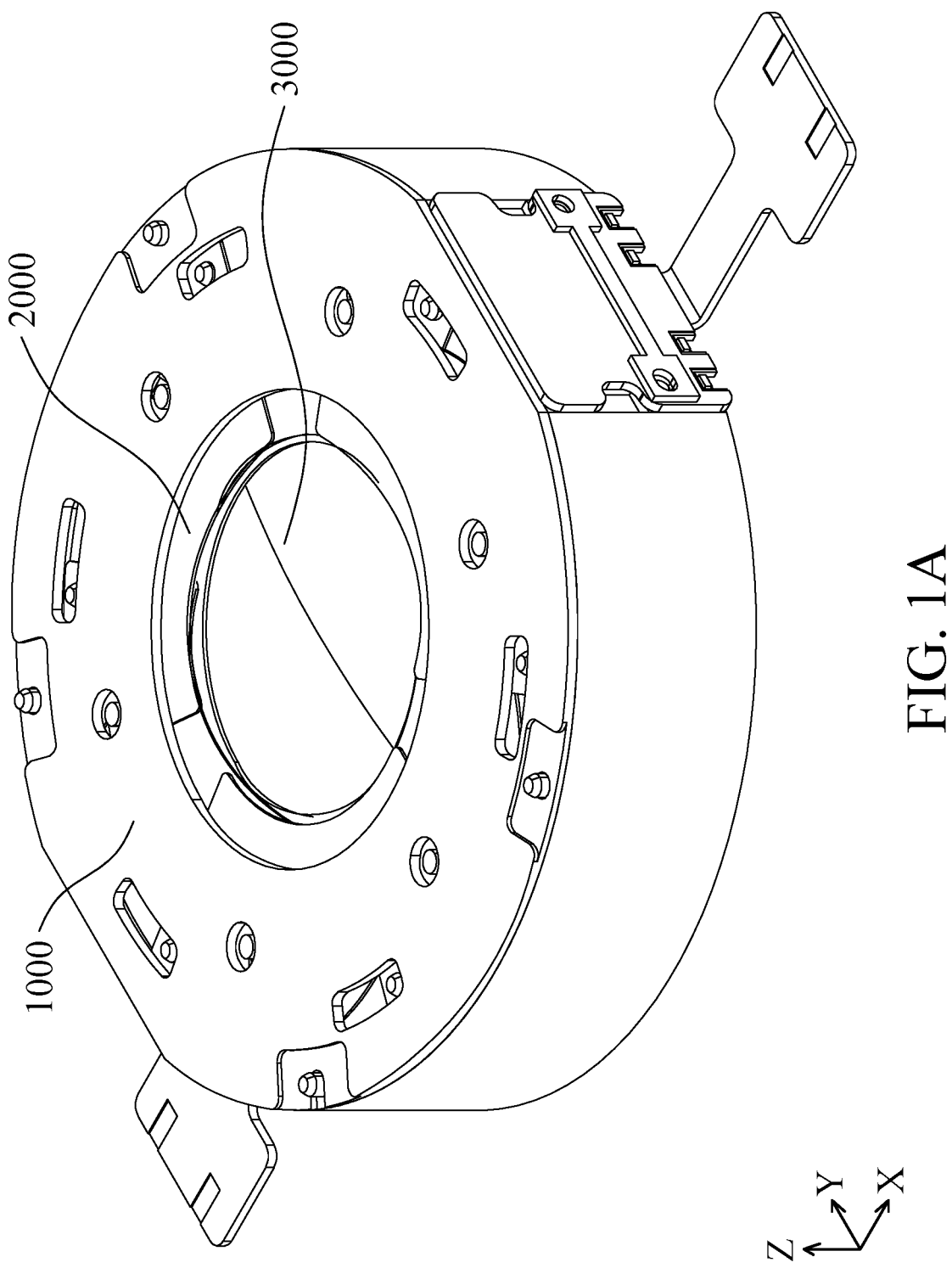
FIG. 1A shows a perspective view of an optical element driving mechanism, an optical element and a lens assembly according to some embodiments of the present disclosure.

The present invention provides an optical element driving mechanism 1000. FIG. 1A shows a perspective view of the optical element driving mechanism 1000, an optical element 2000 and a lens assembly 3000 according to some embodiments of the present disclosure.

The optical element driving mechanism 1000 is configured to drive the optical element (e.g., aperture blades) 2000 to control the amount of light entering the lens assembly 3000. The lens assembly 3000 is loaded in the optical element driving mechanism 1000.

Figure 1B:
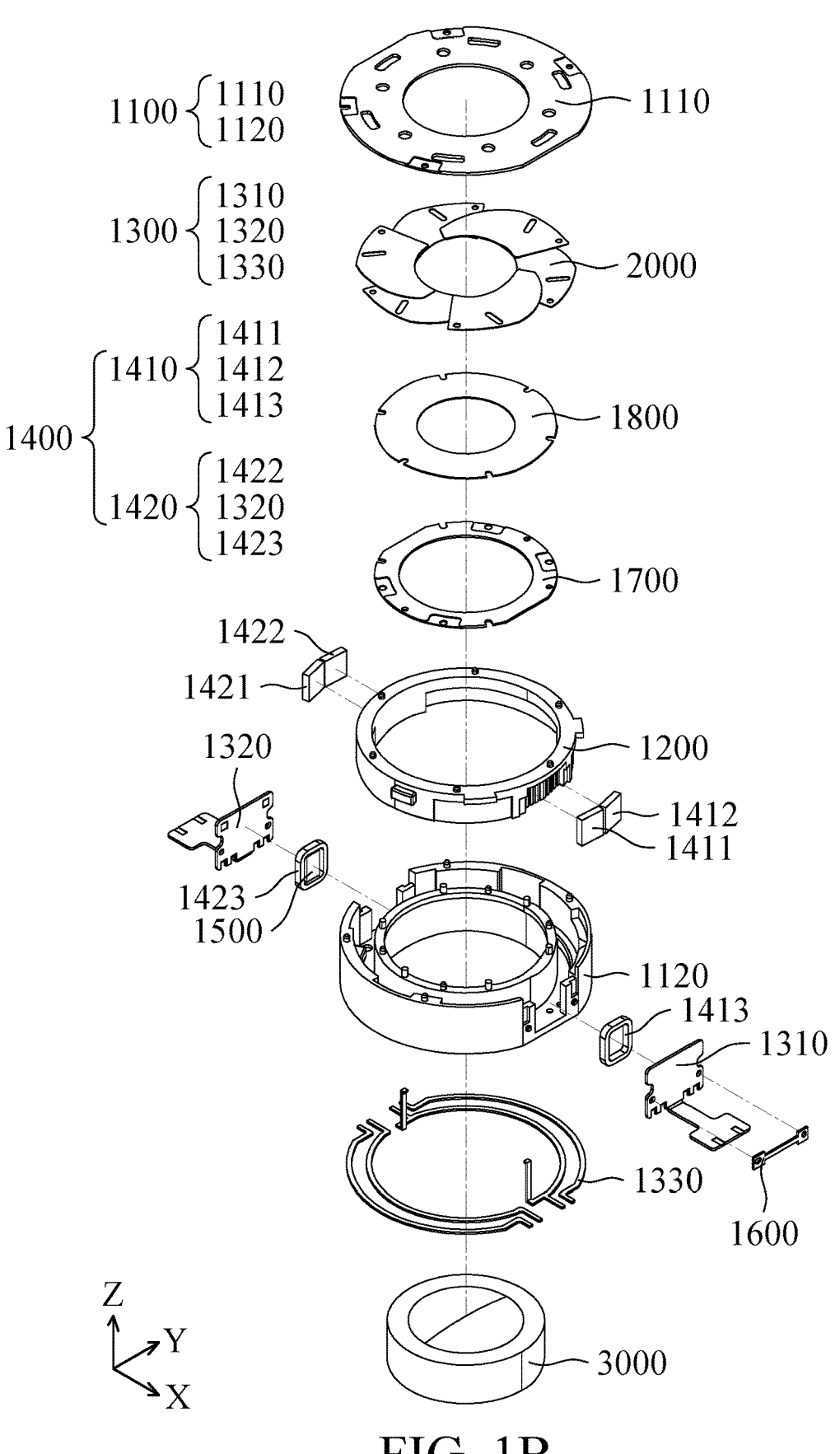
FIG. 1B shows an exploded view of the optical element driving mechanism, the optical element, and the lens assembly according to some embodiments of the present disclosure.

FIG. 1B shows an exploded view of the optical element driving mechanism 1000, the optical element 2000, and the lens assembly 3000 according to some embodiments of the present disclosure. The structure of the optical element driving mechanism 1000 will be described in detail below. Please refer to FIG. 1A and FIG. 1B. According to some embodiments of the present disclosure, the optical element driving mechanism 1000 includes a fixed portion 1100, a movable portion 1200, a circuit member 1300, a driving assembly 1400, an electrical element 1500, a magnetic permeable element 1600, a structural strengthening element 1700 and a light shielding element 1800.

According to some embodiments of the present disclosure, the fixed portion 1100 includes a top cover 1110 and a base 1120. The top cover 1110 is fixedly connected to the base 1120 to form an accommodating space for accommodating other elements of the optical element driving mechanism 1000.

According to some embodiments of the present disclosure, the movable portion 1200 is connected to the optical element 2000. The movable portion 1200 is movable relative to the fixed portion 1100 to drive the optical element 2000, thereby controlling the amount of light entering the lens assembly 3000.

According to some embodiments of the present disclosure, the circuit member 1300 is electrically connected to an external module (not shown). The circuit member 1300 includes a first circuit assembly 1310, a second circuit assembly 1320 and a connecting element 1330. The first circuit assembly 1310 and the second circuit assembly 1320 are disposed on opposite sides of the base 1120.

According to some embodiments of the present disclosure, the connecting element 1330 is disposed in the base 1120 of the fixed portion 1100 by insert molding, and is connected to the first circuit assembly 1310 and the second circuit assembly 1320, the details of which will be described in relation to FIG. 2A.

According to some embodiments of the present disclosure, the driving assembly 1400 is configured to drive the movable portion 1200 to move relative to the fixed portion 1100. The driving assembly 1400 includes a first driving portion 1410 and a second driving portion 1420. The first driving portion 1410 and the second driving portion 1420 are located on opposite sides of the optical element driving mechanism 1000.

According to some embodiments of the present disclosure, the first driving portion 1410 includes a pair of magnetic elements 1411, 1412 and a coil 1413. The second driving portion 1420 includes a pair of magnetic elements 1421, 1422 and a coil 1423.

According to some embodiments of the present disclosure, the magnetic elements 1411, 1412 and the magnetic elements 1421, 1422 are disposed on opposite sides of the movable portion 1200, the details of which will be described in relation to FIG. 4. According to some embodiments of the present disclosure, the coil 1413 is disposed on the first circuit assembly 1310. The coil 1423 is provided on second circuit assembly 1320.

According to some embodiments of the present disclosure, the magnetic elements 1411, 1412 and the coil 1413 correspond to each other. When a driving signal is applied to the first driving portion 1410 (for example, a current is applied by an external power supply), an electromagnetic induction force is generated between the magnetic elements 1411, 1412 and the coil 1413. Thereby, the movable portion 1200 may be driven to rotate around a center C (FIG. 5) of the optical element driving mechanism 1000, to further drive the optical element 2000 to a desired position.

Similarly, the magnetic elements 1421, 1422 and the coil 1423 correspond to each other. When a driving signal is applied to the second driving portion 1420 (for example, a current is applied by an external power supply), an electromagnetic induction force is generated between the magnetic elements 1421, 1422 and the coil 1423. Thereby, the movable portion 1200 may be driven to rotate around a center C (FIG. 5) of the optical element driving mechanism 1000, to further drive the optical element 2000 to a desired position.

According to some embodiments of the present disclosure, the electrical element 1500 is disposed on the second circuit assembly 1320 in a manner that is surrounded by the coil 1423. The electrical element 1500 is an all-in-one IC that packages a sensing integrated circuit and a control integrated circuit in the same package.

According to some embodiments of the present disclosure, the electrical element 1500 may determine the position of the movable portion 1200 by sensing changes in the magnetic field of the magnetic elements 1421 and 1422, and then control the movable portion 1200 to move to a desired position to achieve closed-loop control.

According to some embodiments of the present disclosure, the magnetically permeable element 1600 is disposed on the first circuit assembly 1310, and located on different sides of the first circuit assembly 1310 relative to the coil 1413. The magnetically permeable element 1600 corresponds to the magnetic elements 1411 and 1412 of the first driving portion 1410 provided on the movable portion 1200.

In other words, there is an attractive force between the magnetically permeable element 1600 and the magnetic elements 1411 and 1412, causing the movable portion 1200 to abut against the location of the magnetically permeable element 1600 to prevent the movable portion 1200 from shaking in the fixed portion 1100.

According to some embodiments of the present disclosure, the structural strengthening element 1700 is fixedly disposed on base 1120. The structural strengthening element 1700 is made of a magnetic impermeable (e.g., with low magnetic permeability) metal material (e.g., aluminum alloy). The optical element driving mechanism 1000 is strengthened by the provision of the structural strengthening element 1700.

In particular, the arrangement of the structural strengthening element 1700 may prevent deformation caused by the collision between the lens assembly 3000 and the optical element 2000 when the optical element driving mechanism 1000 falls.

In addition, since the molding of plastic parts requires a relatively thicker thickness, the structural strengthening element 1700 made of metal in the present invention may achieve a thinner thickness compared to the prior art that uses plastic parts as structural strengthening elements, thereby enabling the optical element driving mechanism of the present invention to achieve a thinner form factor.

According to some embodiments of the present disclosure, the light shielding element 1800 is disposed over the structural strengthening element 1700. The light shielding element 1800 may be coated with light-absorbing material. The light shielding element 1800 may reduce reflections caused by metal materials included in the optical element driving mechanism 1000, so that the optical element driving mechanism 1000 may achieve better optical effects.

Although not shown, those skilled in the art should easily understand that the present invention may further include bearings or balls disposed on the fixed portion 1100 to provide support for the movable portion 1200 to move relative to the fixed portion 1100 and to enable the movable portion to move 1200 moves more smoothly relative to the fixed portion 1100.

FIG. 2A shows a perspective view of the circuit member 1300, the coils 1413 and 1423, the electrical element 1500, and the magnetically permeable element 1600 in accordance with some embodiments of the present disclosure.

As shown in FIG. 2A, the first circuit assembly 1310 includes a first circuit element 1311, a first external element 1312 and a pair of positioning holes 1313. According to some embodiments of the present disclosure, the first circuit element 1311 and the first external element 1312 each have a plate-like structure that are perpendicular to each other.

According to some embodiments of the present disclosure, the magnetically permeable element 1600 is disposed on the first circuit element 1311 of the first circuit assembly 1310. The magnetically permeable element 1600 includes a pair of positioning holes 1601. The positioning holes 1313 of the first circuit assembly 1310 is aligned with the positioning holes 1601 of the magnetically permeable element 1600.

According to some embodiments of the present disclosure, the second circuit assembly 1320 includes a second circuit element 1321 and a second external element 1322. According to some embodiments of the present disclosure, the second circuit element 1321 and the second external element 1322 each have a plate-like structure that are perpendicular to each other.

As shown in FIG. 2A, the coil 1413 of the first driving portion 1410 is disposed on the first circuit element 1311 and is electrically connected to the first circuit element 1311. The coil 1423 of the second driving portion 1420 and the electrical element 1500 are disposed on the second circuit element 1321 and are electrically connected to the second circuit element 1321.

According to some embodiments of the present disclosure, the first circuit element 1311 and the second circuit element 1321 are parallel to each other. The first external element 1312 and the second external element 1322 are parallel to each other. The first external element 1312 and the second external element 1322 are respectively electrically connected to the external module (not shown).

According to some embodiments of the present disclosure, the electrical element 1500 is electrically connected to the external module via the second circuit element 1321 and the second external element 1322 in sequence. The electrical element 1500 is electrically connected to the external module via the second circuit element 1321, the connecting element 1330, the first circuit element 1311 and the first external element 1312 in sequence.

According to some embodiments of the present disclosure, the connecting element 1330 includes four connecting sections 1331, two extending portions 1332, and two joint portions 1333. Both ends of each connecting section 1331 are respectively connected to the first circuit element 1311 and the second circuit element 1321 in the XY plane.

According to some embodiments of the present disclosure, the extending portion 1332 extends from the connecting section 1331 along a main axis (Z-axis). The extending portion 1332 is perpendicular to the connecting section 1331, and the extending portion 1332 is parallel to the first circuit element 1311 and the second circuit element 1321. The joint portion 1333 is located at the end of the extending portion 1332, the details of which will be described in relation to FIG. 3A.

According to some embodiments of the present disclosure, the connecting element 1330 may be a plurality of terminals electrically connected to the first circuit element 1311 and the second circuit element 1321. In other words, the connecting element 1330 may be a metal line with a plate-like structure.

Please briefly refer to FIG. 2B, which shows a cross-sectional view of the first circuit element 1311 in accordance with some embodiments of the present disclosure. As shown in FIG. 2B, the first circuit element 1311 includes a metal line 13111. The metal line 13111 has a thickness T1.

Please briefly refer to FIG. 2A and FIG. 2B together. The connecting section 1331 (metal line) of the connecting element 1330 has a thickness T2. In some embodiments, the thickness T1 of the metal line 13111 of the first circuit element 1311 (FIG. 2B) is less than the thickness T2 of the connecting section 1331 (metal line) of the connecting element 1330 (FIG. 2A).

In some embodiments, the ratio of the thickness T1 of the metal line 13111 of the first circuit element 1311 (FIG. 2B) to the thickness T2 of the connecting section 1331 (metal line) of the connecting element 1330 (FIG. 2A) is less than 0.5.

FIG. 3A shows a perspective view of the base 1120, the connecting element 1330 embedded in the base 1120, and the structural strengthening element 1700 according to some embodiments of the present disclosure. For illustrative purposes, FIG. 3B shows a view of the structural strengthening element 1700 separated from the base 1120 of FIG. 3A. Please refer to FIG. 3A and FIG. 3B.

According to some embodiments of the present disclosure, the structural strengthening element 1700 includes a body 1710, a plurality of receiving spaces 1720, a plurality of openings 1730, a plurality of positioning holes 1740, and a pair of cutting portions 1750. The above elements will be described in detail below.

Please refer to FIG. 3A and FIG. 3B together. According to some embodiments of the present disclosure, the body 1710 of the structural strengthening element 1700 has a plate-like structure. The thickness of the body 1710 in the Z direction is less than 0.2 mm and greater than 0.05 mm.

In some embodiments, the four receiving spaces 1720 are recessed structures located on the body 1710. In some embodiments, the depth of the receiving space 1720 in the Z direction is less than 0.2 mm and greater than 0.05 mm. According to some embodiments of the present disclosure, the opening 1730 is located in the receiving space 1720.

As shown in FIGS. 3A and 3B, the base 1120 includes an inner ring portion 1121, an outer ring portion 1122, a middle portion 1123 and a bottom 1124. According to some embodiments of the present disclosure, the middle portion 1123 is a receiving space between the inner ring portion 1121 and the outer ring portion 1122 for accommodating the movable portion 1200 (FIG. 1B).

The movable portion 1200 (FIG. 1B) is movably disposed in the middle portion 1123. The inner ring portion 1121 and the outer ring portion 1122 both extend from the bottom 1124 along the main axis (Z-axis). Both the outer ring portion 1122 and the inner ring portion 1121 are annular structures centered on the main axis (Z-axis), and the radius of the outer ring portion 1122 is larger than the radius of the inner ring portion 1121.

According to some embodiments of the present disclosure, the inner ring portion 1121 includes a plurality of fixing elements 11211, a plurality of first protruding portions 11212, a step 11213, an inner surface 11214, a first surface 11215 and a second surface 11216.

For illustrative purposes, the step 11213, the inner surface 11214, the first surface 11215 and the second surface 11216 are shown in FIG. 6, and will be described in detail later in relation to FIG. 6.

According to some embodiments of the present disclosure, both the fixing element 11211 and the first protruding portion 11212 extend along the main axis (Z-axis). The fixing element 11211 corresponds to the opening 1730 of the structural strengthening element 1700. The fixing element 11211 passes through the opening 1730 to affix the structural strengthening element 1700 to the base 1120 of the fixed portion 1100.

Specifically, the structural strengthening element 1700 may be fixed on the inner ring portion 1121 of the base 1120 by riveting the fixing element 11211 to the opening 1730 of the structural strengthening element 1700. It should be understood that the term "riveting" in the embodiment shown in FIG. 3A and FIG. 3B refers to the process of passing the fixing element 11211, which serves as a plastic part, through the opening of the connecting element (the opening 1730 of the structural strengthening element 1700), then heating and softening the fixing element 11211 and shaping it under the pressure of a rivet head, and finally completing the riveting after cooling.

According to some embodiments of the present disclosure, as the fixing element 11211, once riveted, is positioned within the receiving space 1720 of the structural strengthening element 1700, it is possible to prevent debris generated during processes like riveting from affecting the optical performance of the optical element driving mechanism by adhering the light shielding element 1800 (as shown in FIG. 1B) to the structural strengthening element 1700, thereby securely retaining the debris within the receiving space 1720 of the structural strengthening element 1700.

According to some embodiments of the present disclosure, the first protruding portion 11212 passes through the positioning hole 1740 of the structural strengthening element 1700 to position the structural strengthening element 1700 on the inner ring portion 1121. The first protruding portion 11212 is connected to the optical element (aperture blades) 2000 (FIG. 1B).

According to some embodiments of the present disclosure, the cutting portions 1750 of the structural strengthening element 1700 are located on opposite sides of the structural strengthening element 1700. The cutting portions 1750 each have a straight edge to facilitate positioning the structural strengthening element 1700 during the assembly process. The structural strengthening element 1700 may be fixed on the base 1120 of the fixed portion 1100 by soldering the cutting portion 1750 and the circuit member 1300 (FIG. 1B) together.

According to some embodiments of the present disclosure, the outer ring portion 1122 includes a pair of stopper structures 11221, two pairs of receiving portions 11222, two pairs of positioning elements 11223, and an outer surface

11224, wherein the outer surface 11224 is show in FIG. 6, the details of which will be described in relation to FIG. 6.

According to some embodiments of the present disclosure, the stopper structure 11221 of the outer ring portion 1122 corresponds to the movable portion 1200 (FIG. 1B) to limit the range of motion of the movable portion 1200 within the base 1120.

According to some embodiments of the present disclosure, two pairs of receiving portions 11222 of the outer ring portion 1122 are located on opposite sides of the base 1120. The receiving portion 11222 is a protruding structure extending from the outer ring portion 1122 in the YZ plane.

According to some embodiments of the present disclosure, a space is formed between two pairs of receiving portions 11222, and this space accommodates the coils 1413 and 1423 (FIG. 1B), so as to reduce the volume of the optical element driving mechanism 1000 in the XY plane, thereby achieving the effect of miniaturization of the optical element driving mechanism 1000.

According to some embodiments of the present disclosure, the positioning element 11223 is located on the receiving portion 11222. The positioning element 11223 extends along the direction that is perpendicular to the main axis (Z-axis). The positioning element 11223 passes through positioning hole 1313 on the first circuit element 1311 (FIG. 2A) and the positioning hole 1601 of the magnetically permeable element 1600 (FIG. 2A) in order to position the first circuit element 1311 and the magnetically permeable element 1600 on base 1120.

Similarly, although the positioning element 11223 on the other side is not visible in FIG. 3B, the second circuit element 1321 (FIG. 2A) is also positioned on the base 1120 in a manner similar to the first circuit element 1311.

The joint portion 1333 of the circuit member 1300 exposed from the inner ring portion 1121 of the base 1120 of the fixed portion 1100 is also seen in FIG. 3A. When viewed in the direction parallel to the main axis, the joint portion 1333 partially overlaps the cutting portion 1750 of the structural strengthening element 1700. The structural strengthening element 1700 may be fixed on the base 1120 of the fixed portion 1100 by soldering the joint portion 1333.

Two different ways of fixing the structural strengthening element 1700 are described above, namely through riveting the fixing element 11211 and soldering the joint portion 1333. It should be understood that in some embodiments, it is possible to use either riveting to the fixing element 11211 or soldering to the joint portion 1333, in order to secure structural strengthening element 1700.

FIG. 4 shows a perspective view of the movable portion 1200 and the magnetic elements 1421, 1422 according to some embodiments of the present disclosure. As shown in FIG. 4, the movable portion 1200 includes an upper surface 1210, a plurality of second protruding portions 1220, and a pair of stoppers 1230 (only one of the stopper 1230 can be seen from the perspective of FIG. 4) and a pair of grooves 1240 (only one of the grooves 1240 can be seen from the perspective of FIG. 4).

According to some embodiments of the present disclosure, the upper surface 1210 of the movable portion 1200 is a surface facing the top cover 1110 (FIG. 1B) and parallel to the top cover 1110. The second protruding portion 1220 of the movable portion 1200 extends from the upper surface 1210 along the Z-axis (main axis). The second protruding portion 1220 is connected to the optical element (aperture blades) 2000 (FIG. 1B).

According to some embodiments of the present disclosure, the pair of stopper 1230 of the movable portion 1200 are on opposite sides of the movable portion 1200, and only one of the pair of stopper 1230 can be seen in the perspective of FIG. 4. The stopper 1230 corresponds to the stopper structure 11221 of the base 1120 (FIG. 3B) to limit the range of motion of the movable portion 1200 in the base 1120.

According to some embodiments of the present disclosure, a pair of grooves 1240 of the movable portion 1200 are located on opposite sides of the movable portion 1200, and only one of the pair of grooves 1240 can be seen in the perspective of FIG. 4.

According to some embodiments of the present disclosure, the grooves 1240 are radially inward recessed structures on the movable portion 1200, and the grooves 1240 accommodates the magnetic elements 1411, 1412 and the magnetic elements 1421, 1422. In this way, it is possible to reduce the dimensions of the movable portion 1200 in the XY plane, achieving the effect of miniaturization.

According to some embodiments of the present disclosure, the movable portion 1200 has an annular structure, and the magnetic elements 1411, 1412, 1421, and 1422 each is a rectangular magnet. Two pairs of magnetic elements 1411, 1412 and 1421, 1422 are arranged at an angle (for example, the magnetic elements 1411, 1412 are not arranged parallel to each other) in the groove 1240 to fit the annular structure of the movable portion 1200.

In this way, the magnetic elements 1411, 1412, 1421, and 1422 can be assembled in a mass-production-friendly manner, reducing manufacturing costs. Adhesive elements (not shown) may be filled in the grooves 1240 to secure the magnetic elements 1411, 1412, 1421, 1422 in the grooves. The groove 1240 includes a plurality of protruding portions 1241, so that the adhesion area between the groove 1240 and the magnetic elements 1411, 1412, 1421, 1422 is increased, thereby improving the assembly quality of the movable portion 1200 and the magnetic elements 1411, 1412, 1421, 1422.

FIG. 5 shows a top view of an optical element driving mechanism 1000 in accordance with some embodiments of the present disclosure, with the top cover 1110 not shown for illustrative purposes. As shown in FIG. 5, each aperture blades of the optical element 2000 includes an opening 2100 and a fixed end 2200.

According to some embodiments of the present disclosure, the first protruding portion 11212 of the base 1120 passes through the opening 2100 of the optical element 2000. The second protruding portion 1220 of the movable portion 1200 passes through the fixed end 2200 of the optical element 2000.

In this way, when the movable portion 1200 is driven to move the optical element 2000, the optical element 2000 is movable relative to the fixed portion 1100 through the connection between the fixed end 2200 and the movable portion 1200. At the same time, with the aforementioned movement, the opening 2100 will move relative to the first protruding portion 11212 with the first protruding portion 11212 located therein.

As shown in FIG. 5, the shortest distance D1 between the first protruding portion 11212 of the fixed portion 1100 and the outer surface 11224 of the outer ring portion 1122 is longer than the shortest distance D2 between the second protruding portion 1220 and the outer surface 11224 of the outer ring portion 1122.

That is, the element driving the optical element 2000 (the second protruding portion 1220) is located further from the center C with respect to the optical element driving mechanism 1000, while the guiding shaft (the first protruding portion 11212) that secures the optical element 2000 is positioned closer to the center C relative to the optical element driving mechanism 1000.

In this way, unlike in conventional techniques where the element driving the optical element is closer to the center of the optical element driving mechanism relative to the guiding shaft that fixes the optical element, in the present invention, the range of motion of the optical element 2000 does not extend beyond the outer edge of the movable portion 1200. Therefore, the optical element driving mechanism 1000 of the present invention may achieve miniaturization in the lateral dimensions (XY plane).

FIG. 6 shows a partial cross-sectional view of the optical element driving mechanism 1000 taken along line A-A in FIG. 5. As shown in FIG. 6, the bottom 1124 of the base 1120 includes a bottom surface 11241.

According to some embodiments of the present disclosure, the bottom surface 11241 of the bottom 1124 is parallel to the upper surface 1210 of the movable portion 1200. The bottom surface 11241 of the bottom 1124 and the upper surface 1210 of the movable portion 1200 are planes perpendicular to the main axis (Z-axis).

According to some embodiments of the present disclosure, the distance between the structural strengthening element 1700 disposed on the inner ring portion 1121 and the bottom surface 11241 of the base 1120 is shorter than the distance between the upper surface 1210 of the movable portion 1200 and the bottom surface 11241 of the base 1120.

That is to say, the height of the structural strengthening element 1700 and the light shielding element 1800 on the main axis (Z-axis) is lower than the height of the movable portion 1200 on the base 1120. In this way, the problem that the optical element 2000 is tilted toward the top cover 1110 (FIG. 1B) and affects the optical properties (for example, the amount of incident light) of the optical element driving mechanism 1000 may be avoided. Therefore, the optical element driving mechanism 1000 may achieve better optical effects.

According to some embodiments of the present disclosure, the structural strengthening elements 1700 are provided on the inner ring portion 1121 of the base 1120. As shown in FIG. 6, the first surface 11215 of the inner ring portion 1121 is covered by the structural strengthening element 1700 and the second surface 11216 is not covered by the structural strengthening element 1700.

In other words, the outer edge of the structural strengthening element 1700 is retracted relative to the outer edge of the inner ring portion 1121. This design prevents the movable portion 1200 from colliding with the structural strengthening element 1700 during motion, thereby ensuring the structural strengthening of the optical element driving mechanism 1000.

As shown in FIG. 6, the step 11213 and the inner surface 11214 of the inner ring portion 1121 and the outer surface 11224 of the outer ring portion 1122 are parallel to the main axis (Z-axis). The step 11213 of the inner ring portion 1121 protrudes from the inner surface 11214 in a direction away from the outer surface 11224 of the outer ring portion 1122.

In this way, the lens assembly 3000 may be fixed by filling the space between the inner surface 11214 of the inner ring portion 1121 and the lens assembly 3000 with adhesive elements, thereby miniaturizing the optical element driving mechanism 1000 in the lateral direction.

FIG. 7 shows a structural strengthening element 1700A according to another embodiment of the present disclosure. The difference between the structural strengthening element 1700A shown in FIG. 7 and the structural strengthening element shown in FIG. 3B is that the structural strengthening element 1700A includes a notch 1760A. The notch 1760A is located on one of the pair of cutting portions 1750A.

In this way, the optical element driving mechanism 1000 of the present invention may have a simpler assembly station. Specifically, with the configuration of the cutting portion 1750A and the notch 1760A, it becomes easier for the assembly station to determine the orientation of the structural reinforcement element 1700A relative to the optical element driving mechanism 1000 during the component assembly process, thereby achieving a faster and simpler component assembly process.

In summary, the present invention provides an optical element driving mechanism including the structural strengthening elements. The special relative position and size relationship of each element disclosed in the present invention can not only achieve thinning of the driving mechanism in a specific direction and overall miniaturization, but also further improve the optical quality, for example, more accurately control the amount of light input, etc.

The ordinal numbers in this specification and the scope of the present application, such as "first", "second", etc., have no sequential relationship with each other and are only used to identify two different elements with the same name.

Although the embodiments and their advantages of the present invention have been disclosed above, it should be understood that any modification, substitution and modification can be made by those of ordinary skill in the art without departing from the spirit and scope of the present invention. In addition, the claimed scope of the present invention is not limited to the processes, machines, manufacturing, material compositions, devices, methods and steps in the specific embodiments described in the specification. Those skilled in the art may learn from the disclosure of the present invention. It is understood that processes, machines, manufacturing, material compositions, devices, methods and steps currently or developed in the future can be used according to the present invention as long as they may perform substantially the same functions or obtain substantially the same results in the embodiments described herein. Therefore, the claimed scope of the present invention includes the above-mentioned processes, machines, manufacturing, material compositions, devices, methods and steps. In addition, each claim constitutes an individual embodiment, and the claimed scope of the present invention also includes the combination of each claim and embodiments.

The above-described embodiments are detailed enough for those skilled in the art to implement the devices disclosed in this invention based on the description provided. It is important to note that within the spirit and scope of this invention, minor modifications and refinements can be made. Therefore, the scope of this invention should be determined based on the attached claims.

What is claimed is:

1. An optical element driving mechanism, comprising:
a movable portion connected to an optical element;
a fixed portion, wherein the movable portion is movable relative to the fixed portion;
a driving assembly configured to drive the movable portion to move relative to the fixed portion; and
a structural strengthening element, wherein the structural strengthening element comprises a cutting portion, the cutting portion is on opposite sides of the structural strengthening element, and the cutting portion has a straight edge.

2. The optical element driving mechanism as claimed in claim 1, wherein materials for the structural strengthening elements comprise magnetic impermeable metals or metals with low magnetic permeability.

3. The optical element driving mechanism as claimed in claim 2, wherein the structural strengthening element comprises:
a body with a plate-like structure, wherein a thickness of the body is less than 0.2 mm and greater than 0.05 mm;
a receiving space with a recessed structure and located on the body, and a depth of the receiving space is less than 0.2 mm and greater than 0.05 mm; and
an opening located in the receiving space.

4. The optical element driving mechanism as claimed in claim 3, wherein the fixed portion comprises a fixing element, the opening corresponds to the fixing element, and the fixing element passes through the opening to affix the structural strengthening element to the fixed portion.

5. The optical element driving mechanism as claimed in claim 1, further comprising a circuit member and an electrical element, the driving assembly comprises a first driving portion and a second driving portion, wherein the circuit member is electrically connected to an external module, and the circuit member comprises:
a first circuit element electrically connected to the first driving portion;
a second circuit element electrically connected to the electrical element and the second driving portion;
a connecting element electrically connecting the first circuit element to the second circuit element;
a first external element electrically connected to the external module; and
a second external element electrically connected to the external module.

6. The optical element driving mechanism as claimed in claim 5, wherein the electrical element is electrically connected to the external module via the second circuit element and the second external element in sequence.

7. The optical element driving mechanism as claimed in claim 5, wherein the electrical element is electrically connected to the external module via the second circuit element, the connecting element, the first circuit element and the first external element in sequence.

8. The optical element driving mechanism as claimed in claim 5, wherein the first circuit element comprises a metal line with a plate-like structure, the connecting element comprises another metal line with a plate-like structure, and a thickness of the metal line of the first circuit element is less than a thickness of the another metal line of the connecting element.

9. The optical element driving mechanism as claimed in claim 8, wherein a ratio of the thickness of the metal line of the first circuit element to the thickness of the another metal line of the connecting element is less than 0.5.

10. The optical element driving mechanism as claimed in claim 5, further comprising a magnetically permeable element disposed on the first circuit element of the circuit member, the first driving portion comprises a magnetic element, the magnetic element is disposed on the movable portion, and the magnetically permeable element corresponds to the magnetic element of the first driving portion.

11. The optical element driving mechanism as claimed in claim 5, wherein the connecting element of the circuit member is disposed in the fixed portion by insert molding and is connected to the first circuit element and the second circuit element.

12. The optical element driving mechanism as claimed in claim 11, wherein the connecting element comprises a joint portion exposed from the fixed portion, and the structural strengthening element is affixed to the fixed portion by soldering the joint portion.

13. The optical element driving mechanism as claimed in claim 1, further comprising a circuit member, wherein the structural strengthening element is affixed to the fixed portion by soldering the cutting portions and the circuit member together.

14. The optical element driving mechanism as claimed in claim 1, wherein the fixed portion comprises an outer ring portion, an inner ring portion, a middle portion and a bottom, both the outer ring portion and the inner ring portion are annular structures centered on a main axis, and a radius of the outer ring portion is larger than a radius of the inner ring portion, the outer ring portion and the inner ring portion each extend from the bottom along the main axis, the middle portion is between the outer ring portion and the inner ring portion, the movable portion is movably disposed in the middle portion, and the structural strengthening element is disposed on the inner ring portion.

15. The optical element driving mechanism as claimed in claim 14, wherein the inner ring portion comprises a first surface and a second surface perpendicular to the main axis, wherein the first surface is covered by the structural strengthening element and the second surface is not covered by the structural strengthening element.

16. The optical element driving mechanism as claimed in claim 14, wherein the movable portion comprises an upper surface, the bottom of the fixed portion comprises a bottom surface, the upper surface is parallel to the bottom surface, and the upper surface and the bottom surface are perpendicular to a plane in the main axis.

17. The optical element driving mechanism as claimed in claim 16, wherein a shortest distance between the structural strengthening element provided on the inner ring portion and the bottom surface of the fixed portion is shorter than a shortest distance between the upper surface and the bottom surface.

18. The optical element driving mechanism as claimed in claim 14, wherein the inner ring portion further comprises a step, an inner surface and a first protruding portion; the outer ring portion comprises an outer surface; the movable portion comprises a second protruding portion; and the structural strengthening element comprises a positioning hole; the step of the inner ring portion protrudes from the inner surface in a direction away from the outer surface; the step, the inner surface and the outer surface are parallel to the main axis; the first protruding portion and the second protruding portion extend along the main axis; the first protruding portion passes through the positioning hole of the structural strengthening element to position the structural strengthening element on the inner ring portion, and the first protruding portion and the second protruding portion are respectively connected to the optical element.

19. The optical element driving mechanism as claimed in claim 18, wherein a distance between the first protruding portion and the outer surface of the outer ring portion is greater than a distance between the second protruding portion and the outer surface of the outer ring portion.

\* \* \* \* \*